US012669082B2

(12) United States Patent　　　(10) Patent No.:　US 12,669,082 B2
Onishi et al.　　　　　　　　　　(45) Date of Patent:　　Jun. 30, 2026

(54) SOUNDPROOF COVER

(71) Applicant: Sumitomo Riko Company Limited, Aichi (JP)

(72) Inventors: Kazuyoshi Onishi, Aichi (JP); Akio Yabu, Aichi (JP); Junki Owaki, Aichi (JP); Satoshi Makimura, Aichi (JP); Koki Kaneda, Aichi (JP); Koji Tomiyama, Aichi (JP); Takashi Miyanaga, Gifu (JP); Yukio Hatanaka, Gifu (JP)

(73) Assignee: Sumitomo Riko Company Limited, Aichi (JP)

( * ) Notice: Subject to any disclaimer, the term of this patent is extended or adjusted under 35 U.S.C. 154(b) by 572 days.

(21) Appl. No.: 18/314,093

(22) Filed: May 8, 2023

(65) Prior Publication Data

US 2023/0272740 A1　　Aug. 31, 2023

Related U.S. Application Data

(63) Continuation of application No. PCT/JP2021/043622, filed on Nov. 29, 2021.

(30) Foreign Application Priority Data

Dec. 7, 2020　(JP) ................................. 2020-203034

(51) Int. Cl.
　*F02B 77/13*　　　(2006.01)
　*B32B 3/08*　　　(2006.01)
　(Continued)

(52) U.S. Cl.
　CPC ............... *F02B 77/13* (2013.01); *B32B 3/08* (2013.01); *B32B 5/18* (2013.01); *B32B 5/32* (2013.01);
　(Continued)

(58) Field of Classification Search
　CPC ...... F02B 77/11; F02B 77/13; F04B 39/0033; F04C 29/066; B60R 13/08;
　(Continued)

(56) References Cited

U.S. PATENT DOCUMENTS 3,455,409 A * 7/1969 Clark ................. B62D 25/2072
　　　　　　　　　　　　　　　　　181/200
3,534,828 A * 10/1970 Norton .................... F02B 77/13
　　　　　　　　　　　　　　　　　181/204

(Continued)

FOREIGN PATENT DOCUMENTS

CN　　　102713232　　10/2012
EP　　　1671847 A1 * 6/2006 ....... B29C 45/14336
　　　　　　　(Continued)

OTHER PUBLICATIONS

"International Search Report (Form PCT/ISA/210) of PCT/JP2021/043622", mailed on Dec. 28, 2021, with English translation thereof, pp. 1-6.

(Continued)

*Primary Examiner* — Edgardo San Martin
(74) *Attorney, Agent, or Firm* — JCIPRNET

(57)　　　　　ABSTRACT

A soundproof cover which covers a target object is provided with: a sound absorbing sheet which is formed in a planar shape by means of a sound absorbing material and which covers the surface of the target object; and a reinforcing member which is disposed in a position engaging with engaged portions of the target object, and which positions the sound absorbing sheet with respect to the target object with at least a portion of the sound absorbing sheet exposed. The reinforcing member is provided with: a first reinforcing portion, which is an elongate member and which is disposed in a position engaging with a first engaged portion of the target object; and second reinforcing portions, which are (Continued)

elongate members and which are disposed in different positions to the first reinforcing portion.

28 Claims, 7 Drawing Sheets

(51) Int. Cl.

| | |
|---|---|
| *B32B 5/18* | (2006.01) |
| *B32B 5/32* | (2006.01) |
| *B32B 15/04* | (2006.01) |
| *B32B 25/04* | (2006.01) |
| *B32B 27/06* | (2006.01) |
| *B60R 13/08* | (2006.01) |
| *F02B 77/11* | (2006.01) |
| *F16L 55/02* | (2006.01) |
| *G10K 11/16* | (2006.01) |
| *G10K 11/162* | (2006.01) |
| *H02K 5/24* | (2006.01) |

(52) U.S. Cl.
CPC .......... *B32B 15/046* (2013.01); *B32B 25/045* (2013.01); *B32B 27/065* (2013.01); *B60R 13/08* (2013.01); *B32B 2266/06* (2013.01); *B32B 2266/08* (2013.01); *B32B 2307/102* (2013.01); *B32B 2307/302* (2013.01); *B32B 2307/536* (2013.01); *B32B 2605/00* (2013.01)

(58) Field of Classification Search
CPC ............ B60R 13/0815; B60R 13/0876; B60R 13/0884; F16L 55/02; F04D 29/664; G10K 11/16; G10K 11/162; G10K 11/168; F02M 35/1272; F02M 35/1277; H02K 5/04; H02K 5/24
See application file for complete search history.

(56) References Cited

U.S. PATENT DOCUMENTS

| | | | | |
|---|---|---|---|---|
| 3,589,971 | A * | 6/1971 | Reed ..................... | F16L 59/168 |
| | | | | 383/110 |
| 3,963,087 | A * | 6/1976 | Grosseau ............... | F01N 13/14 |
| | | | | 60/299 |
| 4,612,767 | A * | 9/1986 | Engquist ................. | F01N 13/14 |
| | | | | 60/323 |
| 6,438,949 | B1 * | 8/2002 | Nozaki ................... | F01N 13/14 |
| | | | | 60/272 |
| 6,619,425 | B2 * | 9/2003 | Miyakawa ......... | F02M 35/1272 |
| | | | | 181/204 |
| 7,401,463 | B2 * | 7/2008 | Tsuruta ................... | F16L 59/08 |
| | | | | 60/323 |

| | | | | |
|---|---|---|---|---|
| 7,445,084 | B2 * | 11/2008 | Berbner ............... | G10K 11/162 |
| | | | | 181/290 |
| 7,954,596 | B2 * | 6/2011 | Schulze ............... | G10K 11/168 |
| | | | | 181/290 |
| 8,602,158 | B2 * | 12/2013 | Hayama .................. | F01N 13/14 |
| | | | | 181/227 |
| 10,087,836 | B2 * | 10/2018 | Rowe ........................ | F01P 1/06 |
| 10,486,621 | B2 | 11/2019 | Tomiyama et al. | |
| 11,715,993 | B2 * | 8/2023 | Nishimori ............... | B32B 27/32 |
| | | | | 310/51 |
| 12,098,714 | B2 * | 9/2024 | Kato ................... | F04B 39/0033 |
| 2006/0103171 | A1 * | 5/2006 | Blomeling .......... | B60R 13/0876 |
| | | | | 296/204 |
| 2012/0118664 | A1 | 5/2012 | Era et al. | |
| 2018/0111427 | A1 | 4/2018 | Seo | |

FOREIGN PATENT DOCUMENTS

| | | | | | |
|---|---|---|---|---|---|
| FR | 2990395 | A1 * | 11/2013 | ............... | B32B 7/02 |
| JP | S5768141 | | 4/1982 | | |
| JP | S6338615 | | 3/1988 | | |
| JP | H04327093 | A * | 11/1992 | | |
| JP | H0572597 | | 10/1993 | | |
| JP | H09151788 | | 6/1997 | | |
| JP | H1162047 | A * | 3/1999 | | |
| JP | 2000230431 | | 8/2000 | | |
| JP | 2003050585 | A * | 2/2003 | | |
| JP | 2005337097 | A * | 12/2005 | | |
| JP | 2006183571 | | 7/2006 | | |
| JP | 2006257993 | | 9/2006 | | |
| JP | 2010126677 | | 6/2010 | | |
| JP | 2012040912 | | 3/2012 | | |
| JP | 2012225280 | A * | 11/2012 | | |
| JP | 2015037916 | A * | 2/2015 | | |
| JP | 2016071108 | A * | 5/2016 | | |
| JP | 5929769 | B2 * | 6/2016 | | |
| JP | 2017181968 | | 10/2017 | | |
| JP | 2018070147 | | 5/2018 | | |
| JP | 2019043498 | | 3/2019 | | |
| JP | 2019086551 | | 6/2019 | | |
| JP | 2023124035 | A * | 9/2023 | | |

OTHER PUBLICATIONS

"Office Action of China Counterpart Application", issued on Mar. 22, 2025, with English translation thereof, p. 1-p. 19.
"Office Action of China Counterpart Application", issued on Jul. 19, 2025, with English translation thereof, p1-p18.
"Search Report of Europe Counterpart Application", issued on Mar. 6, 2024, p. 1-p. 8.
"Written Opinion of the International Searching Authority (Form PCT/ISA/237) of PCT/ JP2021/043622", mailed on Dec. 28, 2021, with English translation thereof, pp. 1-15.

* cited by examiner

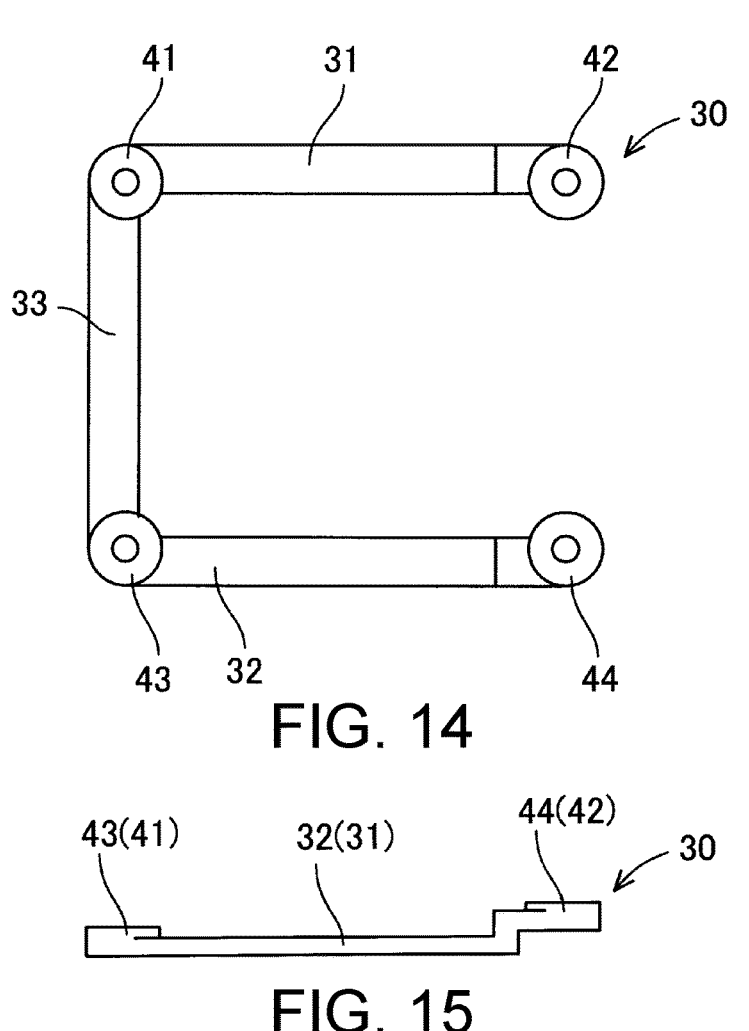
FIG. 14
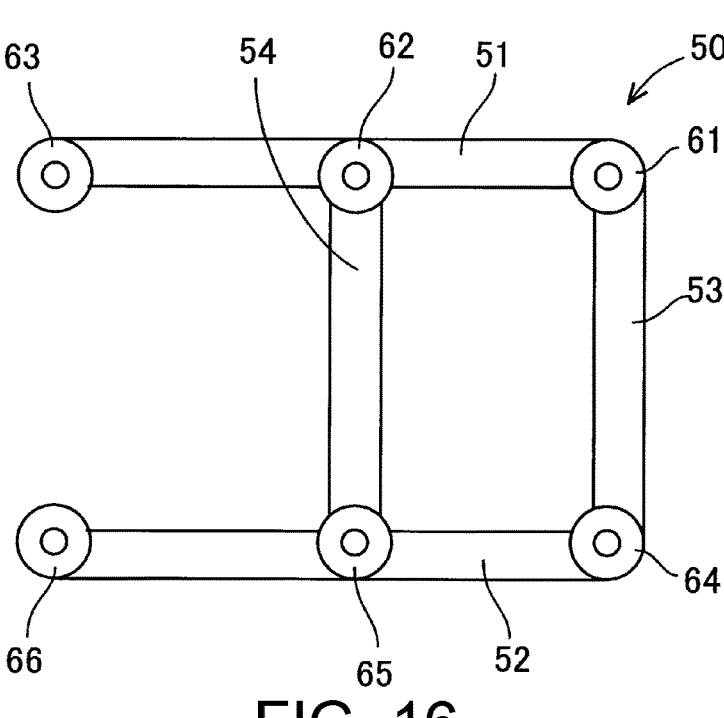
FIG. 15
FIG. 16

SOUNDPROOF COVER

CROSS-REFERENCE TO RELATED APPLICATION

The present application is a continuation of PCT/JP2021/043622, filed on Nov. 29, 2021, and is related to and claims priority from Japanese Patent Application No. 2020-203034, filed on Dec. 7, 2020. The entire contents of the aforementioned application are hereby incorporated by reference herein.

TECHNICAL FIELD

The disclosure relates to a soundproof cover.

RELATED ART

As described in Patent Literatures 1 to 4 (Japanese Patent Laid-Open No. 9-151788, Japanese Patent Laid-Open No. 2006-183571, Japanese Patent Laid-Open No. 2012-40912, Japanese Patent Laid-Open No. 2019-43498), it is known to attach soundproof covers to a drive source of a vehicle. In these soundproof covers, a sound absorbing material is attached to a highly rigid cover body. Further, Patent Literature 5 (Japanese Patent Laid-Open No. 2017-181968) describes a soundproof cover in which a magnetic filler is oriented in a base material composed of resin or elastomer.

However, as the soundproof cover has a highly rigid cover body, the mass of the soundproof cover as a whole increases. It is considered to reduce the weight of the soundproof cover by omitting the cover body. However, if the cover body is omitted, it may not be possible to reliably position the sound absorbing material on the target object.

SUMMARY

The disclosure provides a soundproof cover capable of achieving weight reduction and reliably positioning a sound absorbing material on a target object.

One aspect of the disclosure provides a soundproof cover covering a target object. The soundproof cover includes: a sound absorbing sheet formed in a planar shape from a sound absorbing material and covering a surface of the target object; and a reinforcing member disposed in a position to engage with an engaged portion of the target object and positioning the sound absorbing sheet with respect to the target object with at least a portion of the sound absorbing sheet exposed. The reinforcing member includes: a first reinforcing portion which is an elongate member and is disposed in a position to engage with a first engaged portion of the target object; and a second reinforcing portion which is an elongate member and is disposed in a position different from the first reinforcing portion.

The sound absorbing sheet that constitutes the above soundproof cover is formed in a planar shape from a sound absorbing material and covers the surface of the target object. Thus, a sound absorbing effect can be obtained with the sound absorbing sheet. Here, the sound absorbing sheet is positioned on the target object by the reinforcing member. Thus, even though the sound absorbing sheet is made of a sound absorbing material that does not have sufficient rigidity, the reinforcing member can reliably position the sound absorbing sheet on the target object.

Here, the reinforcing member is in a state where at least a portion of the sound absorbing sheet is exposed. In other words, the reinforcing member does not cover the entire surface of the sound absorbing sheet. Since the area of the reinforcing member is limited to a partial area of the soundproof cover, the weight of the soundproof cover can be reduced.

The reinforcing member includes at least the first reinforcing portion that is an elongate member and the second reinforcing portion that is an elongate member. Thus, by forming the first reinforcing portion and the second reinforcing portion as elongate members, as described above, the surface of the sound absorbing sheet is not entirely covered, and the sound absorbing sheet can be positioned on the target object with at least a portion of the sound absorbing sheet exposed.

It should be noted that the reference numerals in parentheses described in the claims indicate the correspondence with the specific means described in the embodiments described later, and do not limit the technical scope of the disclosure.

BRIEF DESCRIPTION OF DRAWINGS

FIG. 14 is a plan view of the first divided reinforcing member.

FIG. 15 is a view of the first divided reinforcing member seen from below of FIG. 14.

FIG. 16 is a plan view of the second divided reinforcing member.

DESCRIPTION OF EMBODIMENTS

1. Basic Configuration of the Soundproof Cover 1

The basic configuration of a soundproof cover 1 will be described with reference to FIG. 1. The soundproof cover 1 has a function of covering a target object 2 and suppressing transmission of a sound generated by the target object 2 to the outside. Further, the soundproof cover 1 has an additional function of dissipating heat of the target object 2 to the outside. The target object 2 is, for example, the power source of a vehicle. The power source includes a drive motor of the vehicle, a drive engine of the vehicle, etc.

Figure 1:
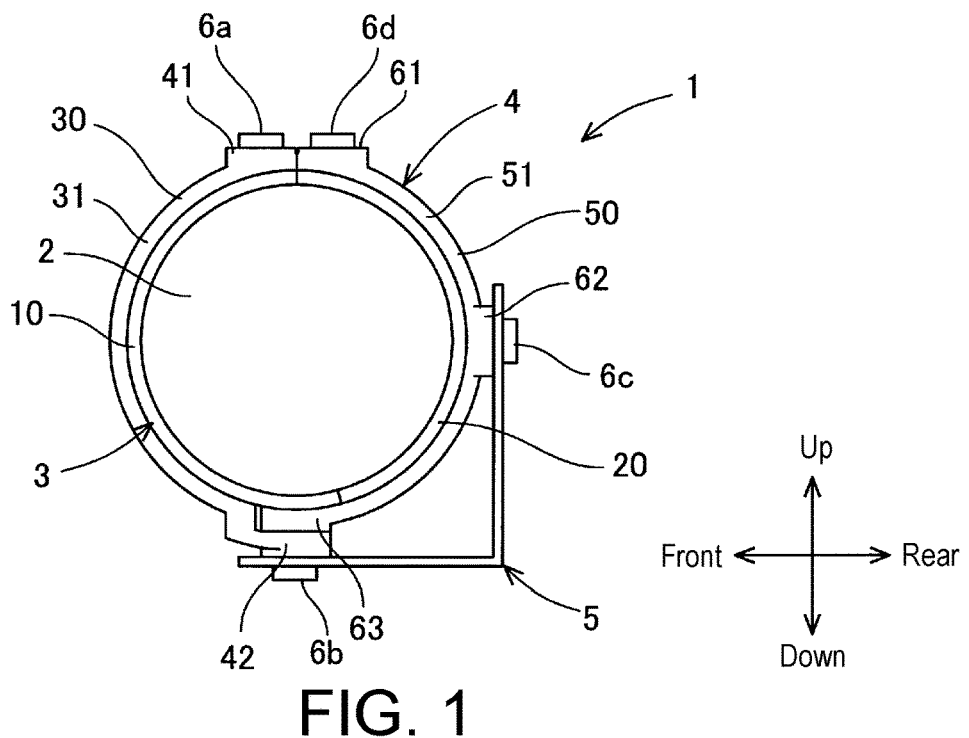
FIG. 1 is a side view of a state where the soundproof cover is attached to the target object.

Here, FIG. 1 shows a case where the target object 2 is a drive motor of the vehicle. Further, the drive motor in FIG. 1 illustrates a case where the drive motor has a cylindrical outer peripheral surface. However, the outer peripheral surface of the drive motor is not limited to a cylindrical surface, and may be formed in an uneven shape as appropriate. In addition, for example, the rotational axis of the drive motor is disposed to coincide with the left-right direction of the vehicle, with the left side of FIG. 1 being the front of the vehicle and the right side being the rear of the vehicle. In general, the front surface of the vehicle is an area that can directly receive the airflow as the vehicle travels, and the rear surface of the vehicle is an area that does not directly receive the airflow.

The soundproof cover 1 covers a surface of the target object 2. For example, as shown in FIG. 1, when the target object 2 is a drive motor, the soundproof cover 1 covers the outer peripheral surface of the drive motor. The soundproof cover 1 covers the outer peripheral surface of the target object 2 over the entire circumference, but there may be a portion that is not covered.

The soundproof cover 1 includes a sound absorbing sheet 3, a reinforcing member 4, and a ventilation guide 5. The sound absorbing sheet 3 is formed in a planar shape from a sound absorbing material and covers the surface of the target object 2. Thus, the sound absorbing sheet 3 can provide a soundproof effect. The sound absorbing sheet 3 may be formed in a shape corresponding to the surface shape of the target object 2 in advance. In addition, the sound absorbing sheet 3 may be formed in a flat shape from a deformable material and attached to the surface of the target object 2 while being deformed. The sound absorbing sheet 3 has heat dissipating performance in addition to sound absorbing performance.

The sound absorbing sheet 3 is preferably made of a material having excellent sound absorbing performance such as foamed resin. Examples of the foamed resin include urethane foam, acrylic foam, silicone foam, styrene foam, foamed olefin (foamed PP, foamed PE), foamed PVC, foamed EVA, foamed PA, etc. The foamed resin of the sound absorbing sheet 3 has an Asker C hardness of 1 to 60 degrees. The sound absorbing sheet 3 may be made of non-foamed resin having sound absorbing performance, or may be made of metal. Examples of the non-foamed resin include polyamide resin, olefin resin, styrene resin, urethane resin, silicone resin, acrylic resin, polyvinyl chloride resin, polyethylene resin, polyethylene terephthalate resin, polycarbonate resin, polypropylene resin, ABS resin, EVA resin, carbon fiber plastic (FRP, CFRP), etc. In addition, examples of the metal include iron, aluminum, SUS, copper, and alloys thereof. However, foamed resin which is excellent in terms of sound absorbing performance is suitable.

Furthermore, the sound absorbing sheet 3 may be made of foamed resin containing a thermally conductive material so that the sound absorbing sheet 3 has heat dissipating performance. The thermally conductive material may extend from the back surface toward the front surface of the sound absorbing sheet 3. For example, when the thermally conductive material is a thermally conductive filler, the thermally conductive filler is arranged from the back surface toward the front surface of the sound absorbing sheet 3. Furthermore, the filling amount of the thermally conductive material may vary depending on the position of the sound absorbing sheet 3. For example, since the rear surface of the vehicle is more difficult to cool than the front surface of the vehicle, the filling amount of the thermally conductive material on the rear surface of the vehicle may be larger than the filling amount on the front surface of the vehicle. The filling amount here means the filling amount per unit area in the surface direction of the sound absorbing sheet 3. Moreover, when the thermally conductive material is a metal plate, the thermally conductive material may be insert-molded so as to extend from the back surface toward the front surface of the sound absorbing sheet 3.

In FIG. 1, the sound absorbing sheet 3 is composed of a plurality of divided bodies 10 and 20 (first divided sound absorbing sheet 10 and second divided sound absorbing sheet 20) that are formed separately. Approximately half of the outer peripheral surface of the target object 2 is covered by each of the divided bodies 10 and 20. The divided bodies 10 and 20 that are adjacent to each other in the circumferential direction on the outer peripheral surface of the target object 2 are disposed so as to abut each other in the circumferential direction of the outer peripheral surface of the target object 2.

The reinforcing member 4 positions the sound absorbing sheet 3 with respect to the target object 2. The reinforcing member 4 may be formed separately from the sound absorbing sheet 3 and disposed on the front surface of the sound absorbing sheet 3 so that the sound absorbing sheet 3 is disposed and sandwiched between the reinforcing member 4 and the target object 2. Further, the reinforcing member 4 may be integrated with the sound absorbing sheet 3 and disposed on the front surface of the sound absorbing sheet 3 so that the sound absorbing sheet 3 is disposed and sandwiched between the reinforcing member 4 and the target object 2. Moreover, the reinforcing member 4 may be integrated with the peripheral surface of the sound absorbing sheet 3.

Figure 4:
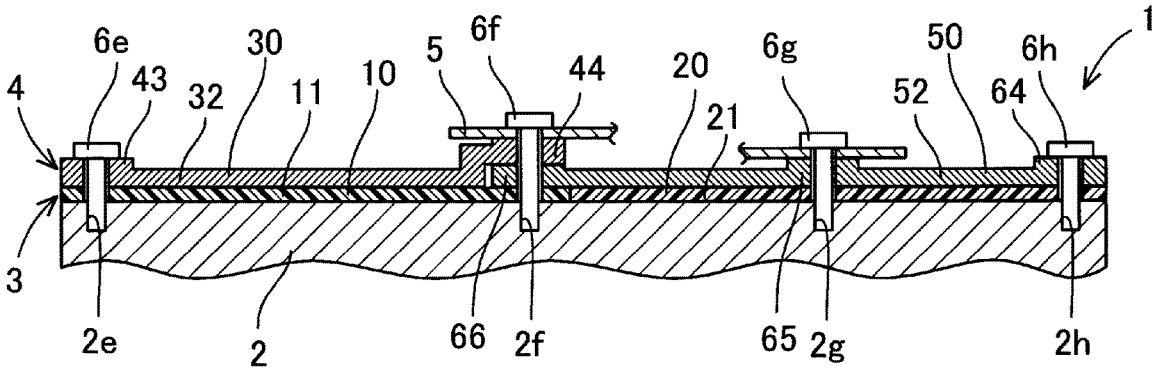
FIG. 4 is a view of the cross section IV-IV of FIG. 2.
Figure 5:
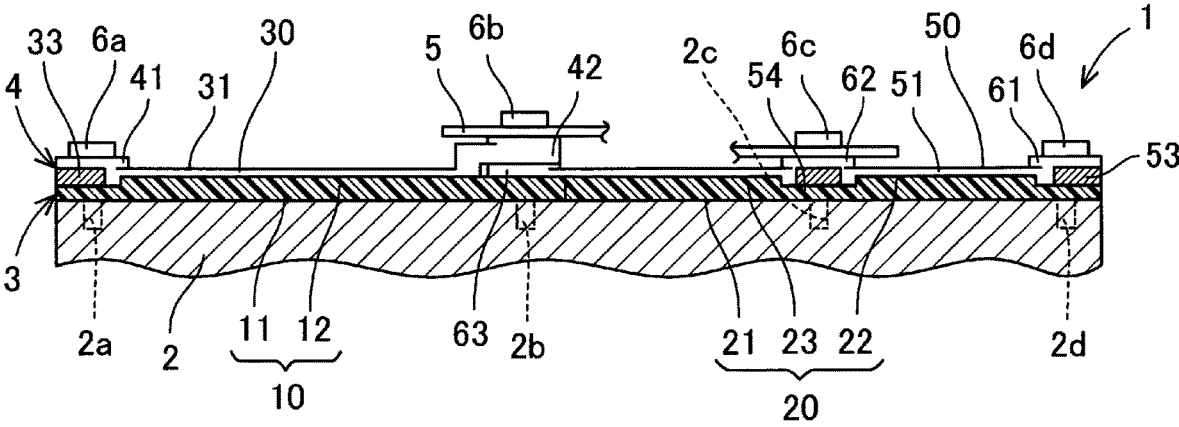
FIG. 5 is a view of the cross section V-V of FIG. 2.
Figure 6:
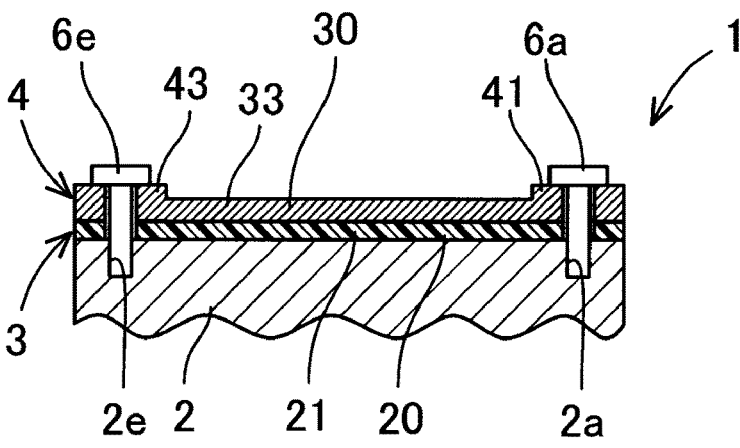
FIG. 6 is a view of the cross section VI-VI of FIG. 3.
Figure 7:
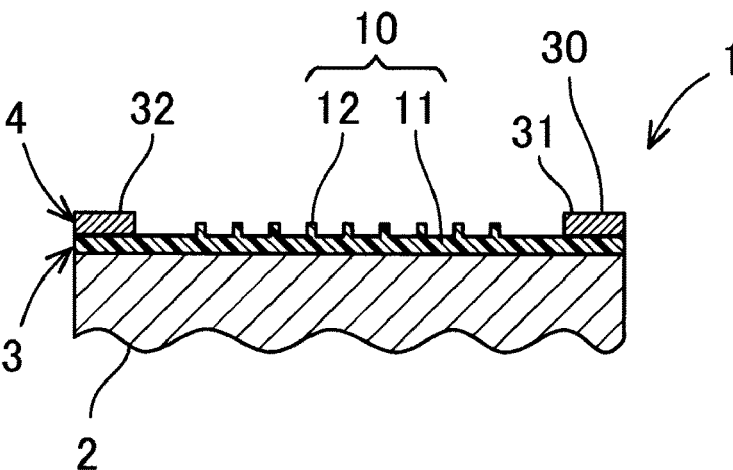
FIG. 7 is a view of the cross section VII-VII of FIG. 3.
Figure 8:
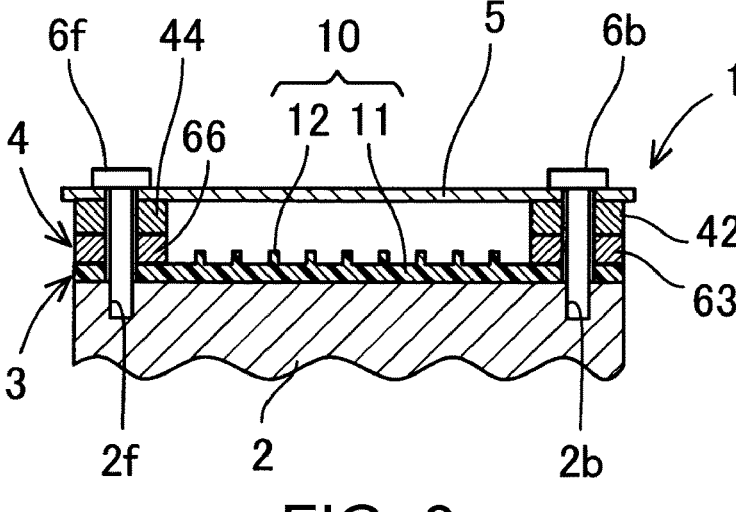
FIG. 8 is a view of the cross section VIII-VIII of FIG. 3.
Figure 9:
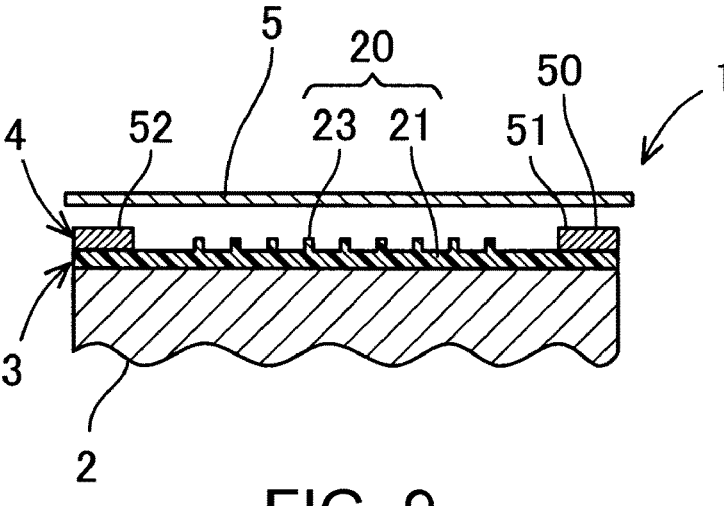
FIG. 9 is a view of the cross section IX-IX of FIG. 3.
Figure 10:
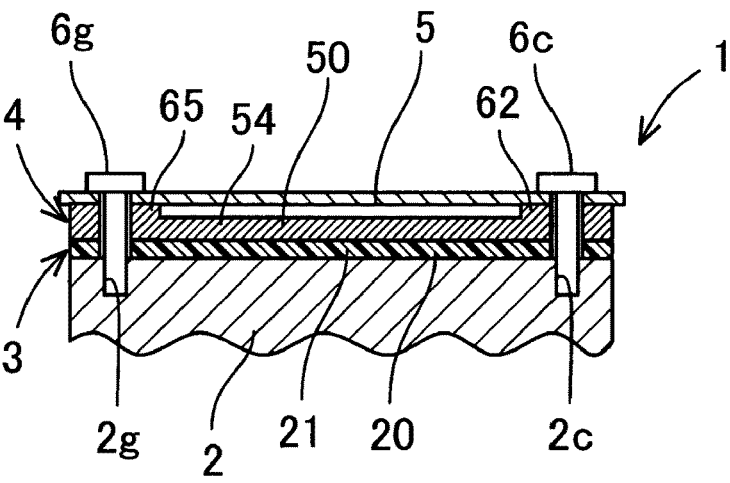
FIG. 10 is a view of the cross section X-X of FIG. 3.
Figure 11:
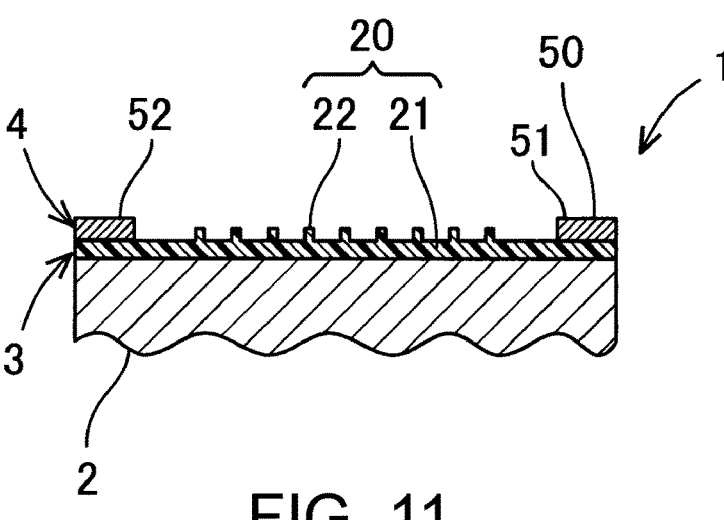
FIG. 11 is a view of the cross section XI-XI of FIG. 3.
Figure 12:
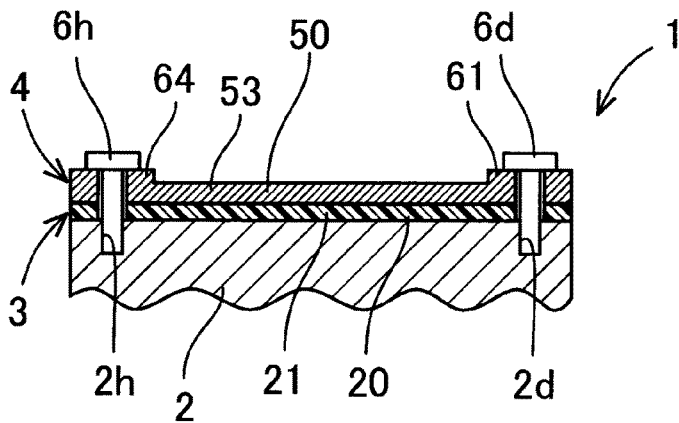
FIG. 12 is a view of the cross section XII-XII of FIG. 3.

In addition, as a method of fixing the reinforcing member 4 to the target object 2, for example, as shown in FIG. 1, the reinforcing member 4 may be engaged with the target object 2 by engaging members 6a, 6b, 6c, and 6d. In other words, the reinforcing member 4 is engaged with the target object 2 by the engaging members 6a to 6d in a state of being disposed in a position to engage with engaged portions (2a, 2b, 2c, 2d, 2e, 2f, 2g, and 2h in FIG. 4 and FIG. 5) of the target object 2 so that the reinforcing member 4 is fixed to the target object. The engaging members 6a to 6d include, for example, fastening members such as bolts and locking members such as claws.

The reinforcing member 4 is made of a material having higher rigidity than the sound absorbing sheet 3. The highly rigid material refers to a material having high rigidity (an index representing difficulty in bending) when the sound absorbing sheet 3 and the reinforcing member 4 to be compared are formed in the same shape. The sound absorbing sheet 3 is formed in a planar shape from foamed resin, for example. As described above, when the sound absorbing sheet 3 is made of a sound absorbing material that does not have sufficient rigidity, the effect of positioning to the target object 2 with the sound absorbing sheet 3 alone is low. Even in such a case, the sound absorbing sheet 3 can be reliably positioned with respect to the target object 2 by the reinforcing member 4.

Further, the reinforcing member 4 is made of a material having a larger mass per unit volume (hereinafter referred to as "unit mass") than the sound absorbing sheet 3. As described above, in order for the reinforcing member 4 to exert a reinforcing function, the reinforcing member 4 is made of a material having a larger unit mass than the sound absorbing sheet 3 as a result.

The reinforcing member 4 may be made of foamed resin in order to reduce the weight. However, the foamed resin applied to the reinforcing member 4 is different from the foamed resin applied to the sound absorbing sheet 3. For example, examples of the foamed resin applied to the reinforcing member 4 include urethane foam, acrylic foam, silicone foam, styrene foam, foamed olefin (foamed PP, foamed PE), foamed PVC, foamed EVA, foamed PA, etc. The foamed resin of the reinforcing member 4 has an Asker C hardness of 60 to 99 degrees. Even if urethane foam is applied to the sound absorbing sheet 3 and the reinforcing member 4, the urethane foams of the sound absorbing sheet 3 and the reinforcing member 4 are of different types.

Further, the reinforcing member 4 can also be made of foamed rubber, non-foamed resin or metal in addition to foamed resin. Examples of the foamed rubber include foamed EPDM, foamed CR, foamed NBR/PVC, foamed ACM, etc. In addition, examples of the non-foamed resin include polyamide resin, olefin resin, styrene resin, urethane resin, silicone resin, acrylic resin, polyvinyl chloride resin, polyethylene resin, polyethylene terephthalate resin, polycarbonate resin, polypropylene resin, ABS resin, EVA resin, carbon fiber plastic (FRP, CFRP), etc. Besides, examples of the metal include iron, aluminum, SUS, copper, and alloys thereof. The reinforcing member in these cases is made of rubber, resin or metal having higher hardness than foamed resin. However, from the viewpoint of weight reduction, foamed resin is preferable.

In addition, the reinforcing member 4 is not disposed to cover the entire front surface of the sound absorbing sheet 3, but is disposed in a state where at least a portion of the sound absorbing sheet 3 is exposed. As described above, the sound absorbing sheet 3 has heat dissipating performance in addition to sound absorbing performance. Thus, by exposing the sound absorbing sheet 3, the heat dissipating performance of the sound absorbing sheet 3 can be effectively exhibited.

The reinforcing member 4 is disposed to expose a portion of the sound absorbing sheet 3, which means that the reinforcing member 4 is disposed to face only a portion of the outer peripheral surface of the target object 2. Thus, the size of the reinforcing member 4 itself can be made small compared to the size of the outer peripheral surface of the target object 2. Even though the reinforcing member 4 has a larger unit mass than the sound absorbing sheet 3, since the area of the reinforcing member 4 is limited to a portion of the soundproof cover 1, the influence on the mass increase of the soundproof cover 1 as a whole can be reduced. In other words, the weight of the soundproof cover 1 can be reduced.

The reinforcing member 4 is composed of a plurality of divided bodies 30 and 50 (first divided reinforcing member 30 and second divided reinforcing member 50) that are formed separately. The first divided reinforcing member 30 mainly positions the first divided sound absorbing sheet 10, and the second divided reinforcing member 50 mainly positions the second divided sound absorbing sheet 20. Further, the first divided reinforcing member 30 and the second divided reinforcing member 50 are fixed to each other by the engaging member 6b.

As will be described later, the reinforcing member 4 is formed as an elongate member. By forming the reinforcing member 4 as an elongate member, as described above, the surface of the sound absorbing sheet 3 is not entirely covered, and the sound absorbing sheet 3 can be positioned on the target object 2 with at least a portion of the sound absorbing sheet 3 exposed.

The ventilation guide 5 is disposed oppositely along at least a portion of the front surface of the sound absorbing sheet 3. The ventilation guide 5 has a space between the ventilation guide and the front surface of the sound absorbing sheet 3. The ventilation guide 5 guides the flow of a fluid between the ventilation guide 5 and the front surface of the sound absorbing sheet 3. In other words, the ventilation guide 5 has a function of enhancing the cooling effect of the sound absorbing sheet 3.

As shown in FIG. 1, the ventilation guide 5 is, for example, formed in an L shape from a plate-shaped member and is fixed to the reinforcing member 4 by the engaging members 6b and 6c. The ventilation guide 5 may be made of the same material as the reinforcing member 4, or may be made of a different material from the reinforcing member 4, for example. However, the ventilation guide 5 may have the same degree of rigidity as the reinforcing member 4.

In particular, the ventilation guide 5 is disposed to face the rear surface of the target object 2 in the front-rear direction of the vehicle, and guides the fluid flowing from the front to the rear of the vehicle to the rear surface of the target object 2. In other words, the ventilation guide 5 effectively exhibits a cooling effect on the rear surface of the target object 2.

2. Detailed Configuration of the Soundproof Cover 1

A detailed configuration of the soundproof cover 1 will be described with reference to FIG. 2 to FIG. 17. As shown in FIG. 1, the soundproof cover 1 is formed in a shape corresponding to the surface shape of the target object 2. However, in order to facilitate the description, FIG. 2 to FIG. 17 show views of a state where the soundproof cover 1 is expanded in a flat shape, and the following will be described using these views.

The soundproof cover 1 includes the sound absorbing sheet 3, the reinforcing member 4, and the ventilation guide 5 as described above. The sound absorbing sheet 3 and the reinforcing member 4 will be described in detail below. In this example, the sound absorbing sheet 3 is composed of two separately formed divided bodies (first divided sound absorbing sheet 10 and second divided sound absorbing sheet 20). The sound absorbing sheet 3 may be composed of three or more divided bodies, or may be composed of only one sheet.

The first divided sound absorbing sheet 10 includes a first sheet body 11 and a plurality of heat dissipating fins 12. The first sheet body 11 and the heat dissipating fins 12 are integrated. The first sheet body 11 is formed in a planar shape, and the back surface of the first sheet body 11 contacts a portion of the surface of the target object 2, for example, a range of about half circumference.

The heat dissipating fins 12 are provided on the front surface of the first divided sound absorbing sheet 10 so as to extend in the surface direction of the first divided sound absorbing sheet 10. That is, the heat dissipating fins 12 are provided so as to protrude outward from the front surface of the first sheet body 11. The plurality of heat dissipating fins 12 are formed, for example, as ridges extending in the circumferential direction of the outer peripheral surface of the target object 2 and are arranged with a distance in the axial direction of the outer peripheral surface of the target object 2. However, the shape of the heat dissipating fins 12 may be wavy, may be formed so as to extend in the axial direction of the outer peripheral surface of the target object 2 or may be formed so as to extend in a direction inclined with respect to the circumferential direction and the axial direction of the outer peripheral surface of the target object 2.

For example, when the first divided sound absorbing sheet 10 is made of foamed resin containing a thermally conductive material, the thermally conductive material may continuously extend in the surface normal direction of the first sheet body 11 from the back surface of the first sheet body 11 to the tips of the heat dissipating fins 12. Thus, the thermally conductive material is continuously disposed in the range from the surface of the target object 2 to the tips of the heat dissipating fins 12 so that high heat dissipating performance can be exhibited. A conductive filler is suitable for the thermally conductive material in this case.

For example, when the first divided sound absorbing sheet 10 is made of foamed resin containing a thermally conductive material, the thermally conductive material (second thermally conductive material) may extend continuously in the extending direction of the heat dissipating fins 12 on the tip side of the heat dissipating fins 12. Thus, the thermally conductive material is arranged continuously in the range from one end side to the other end side in the extending direction of the heat dissipating fins 12 so that high heat dissipating performance can be exhibited even in the surface direction. Metal foils such as copper, stainless steel, steel, and aluminum, metal films such as aluminum deposition films, electrically conductive fillers, thermally conductive resin films, etc. can be used as the thermally conductive material in this case. Moreover, a metal foil or a metal film and a resin film may be laminated. The thermally conductive material may be provided only in specific areas of the plurality of heat dissipating fins or only in specific heat dissipating fins, or may be disposed on the tip side or the outer surface of the side surface of the heat dissipating fins.

Figure 2:
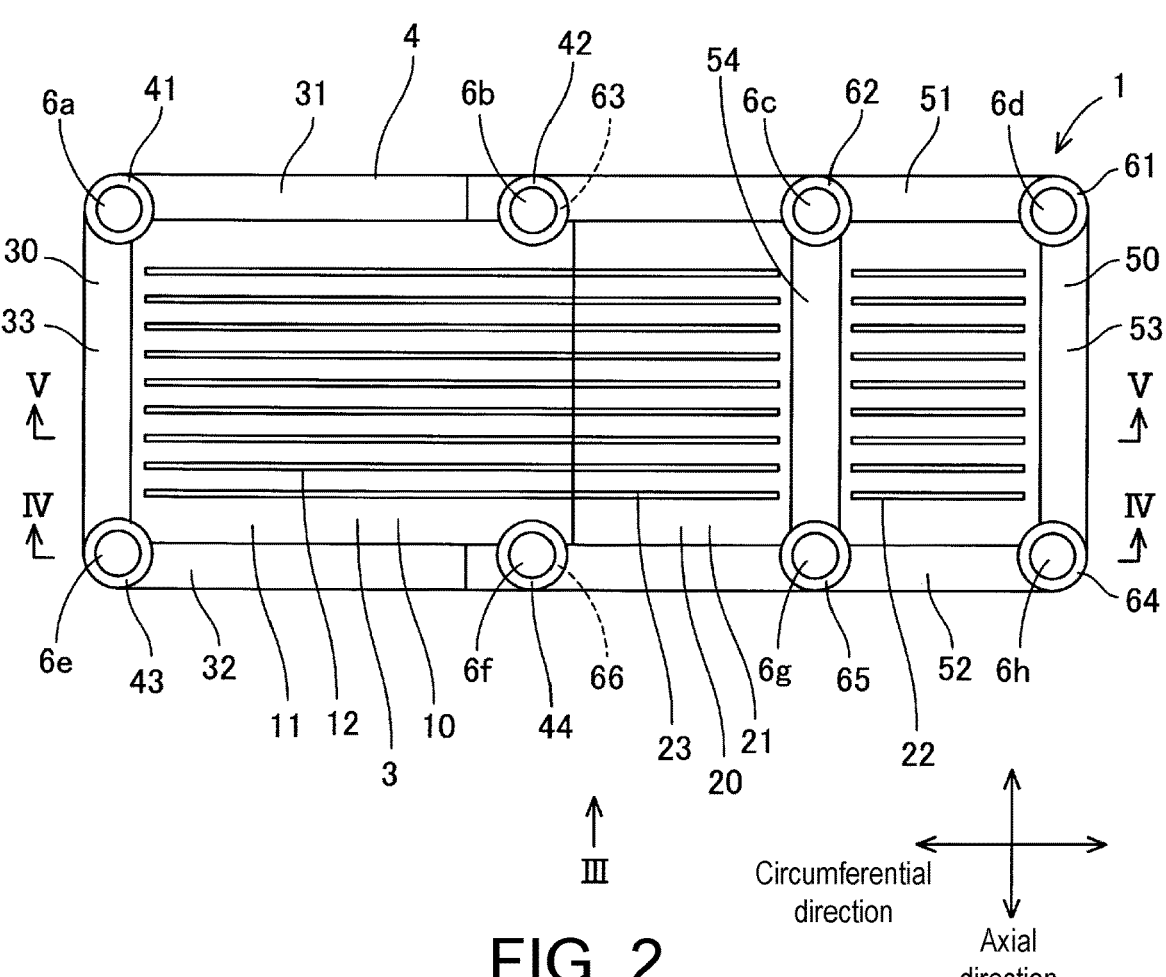
FIG. 2 is a plan view of a state where the soundproof cover is expanded in a flat shape.
Figure 3:
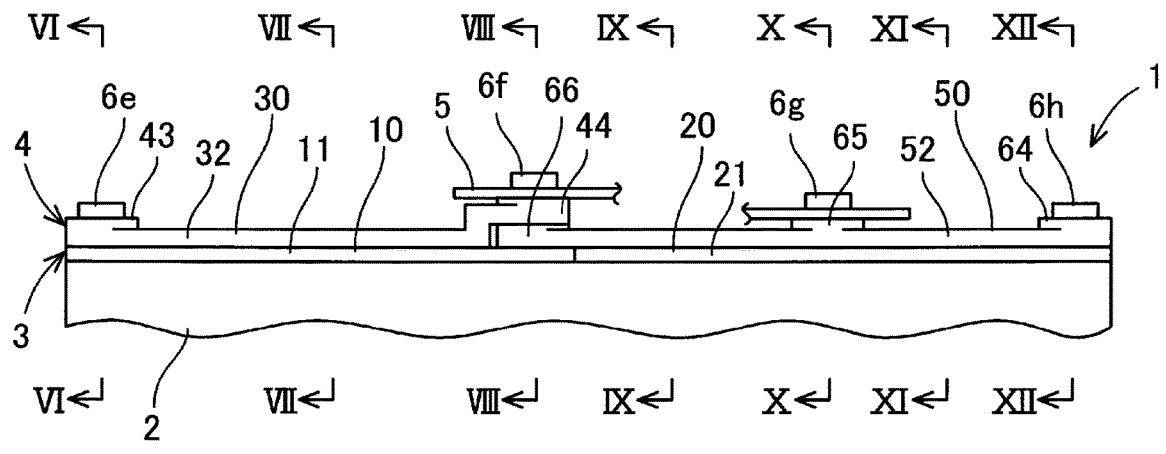
FIG. 3 is a view seen from the direction III of FIG. 2.

As shown in FIG. 2 and FIG. 3, the second divided sound absorbing sheet 20 includes a second sheet body 21 and a plurality of heat dissipating fins 22 and 23. The second sheet body 21 and the heat dissipating fins 22 and 23 are integrated. The second sheet body 21 is formed in a planar shape, and the back surface of the second sheet body 21 contacts a portion of the surface of the target object 2, for example, a range of about half circumference. The second sheet body 21 is disposed to abut the first sheet body 11 in the circumferential direction of the target object 2. In other words, the first sheet body 11 and the second sheet body 21 are disposed continuously in the circumferential direction of the target object 2.

The heat dissipating fins 22 and 23 are provided on the front surface of the second divided sound absorbing sheet 20 so as to extend in the surface direction of the second divided sound absorbing sheet 20. That is, the heat dissipating fins 22 and 23 are provided so as to protrude outward from the front surface of the second sheet body 21. The plurality of heat dissipating fins 22 and 23 are formed, for example, as ridges extending in the circumferential direction of the outer peripheral surface of the target object 2 and are arranged with a distance in the axial direction of the outer peripheral surface of the target object 2. However, the shape of the heat dissipating fins 22 and 23 may be wavy, may be formed so as to extend in the axial direction of the outer peripheral surface of the target object 2 or may be formed so as to extend in a direction inclined with respect to the circumferential direction and the axial direction of the outer peripheral surface of the target object 2.

Moreover, the heat dissipating fins 23 of the second divided sound absorbing sheet 20 are disposed continuously with the heat dissipating fins 12 of the first divided sound absorbing sheet 10 in the circumferential direction of the target object 2. In other words, the ends of the heat dissipating fins 12 of the first divided sound absorbing sheet 10 and the ends of the heat dissipating fins 23 of the second divided sound absorbing sheet 20 are disposed to abut each other.

For example, when the second divided sound absorbing sheet 20 is made of foamed resin containing a thermally conductive material, the thermally conductive material may continuously extend in the surface normal direction of the second sheet body 21 from the back surface of the second sheet body 21 to the tips of the heat dissipating fins 22 and 23. Thus, the thermally conductive material is continuously disposed in the range from the surface of the target object 2 to the tips of the heat dissipating fins 22 and 23 so that high heat dissipating performance can be exhibited. A conductive filler is suitable for the thermally conductive material in this case.

For example, when the second divided sound absorbing sheet 20 is made of foamed resin containing a thermally conductive material, the thermally conductive material (second thermally conductive material) may extend continuously in the extending direction of the heat dissipating fins 22 and 23 on the tip side of the heat dissipating fins 22 and 23. Thus, the thermally conductive material is arranged continuously in the range from one end side to the other end side in the extending direction of the heat dissipating fins 22 and 23 so that high heat dissipating performance can be exhibited even in the surface direction. Metal foils such as copper, stainless steel, steel, and aluminum, metal films such as aluminum deposition films, electrically conductive fillers, thermally conductive resin films, etc. can be used as the thermally conductive material in this case. Moreover, a metal foil or a metal film and a resin film may be laminated. The thermally conductive material may be provided only in specific areas of the plurality of heat dissipating fins or only in specific heat dissipating fins, or may be disposed on the tip side or the outer surface of the side surface of the heat dissipating fins.

Further, when the first divided sound absorbing sheet 10 and the second divided sound absorbing sheet 20 are made of foamed resin, the following may be adopted. The front layers of the first divided sound absorbing sheet 10 and the second divided sound absorbing sheet 20 may be in a closed cell state where the cells of the foamed resin are closed, and the back layers may be in an open cell state where the cells of the foamed resin are open. By forming the front layers into a closed cell state, it is possible to suppress the pressure loss when the fluid flows so that the heat dissipating performance can be improved. On the other hand, by forming the back layers into an open cell state, the sound absorbing performance can be enhanced. In other words, with the above configuration, the sound absorbing performance and heat dissipating performance can be improved.

In this example, the reinforcing member 4 is composed of two separately formed divided bodies (first divided reinforcing member 30 and second divided reinforcing member 50). The reinforcing member 4 may be composed of three or more divided bodies, or may be composed of only one member.

Figure 13:
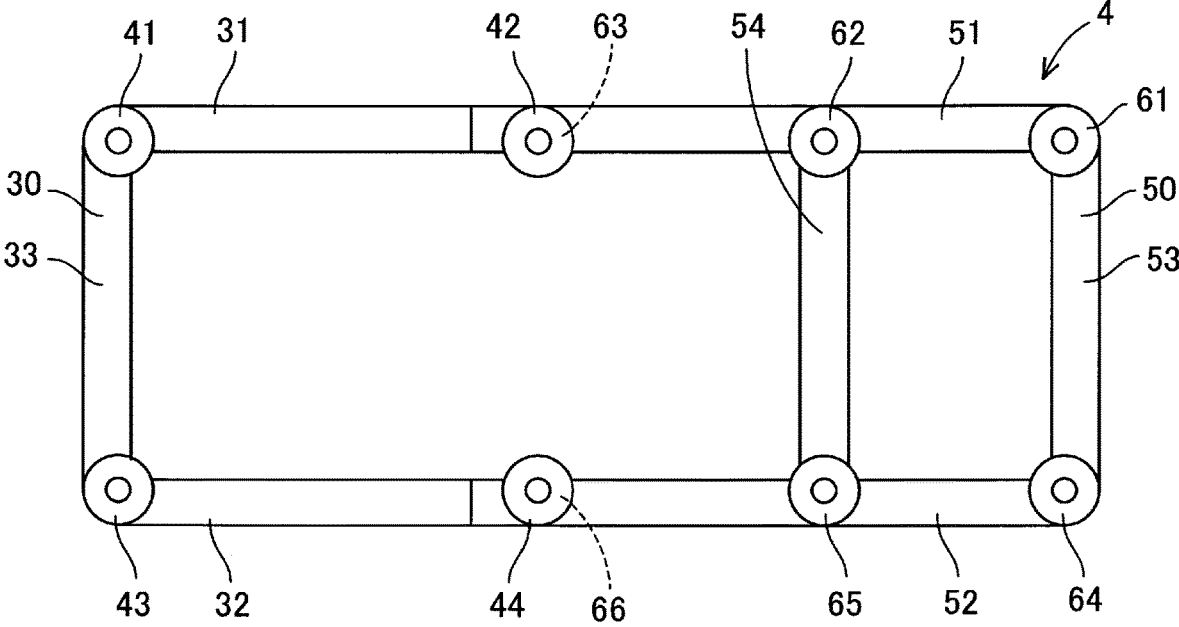
FIG. 13 is a plan view of the reinforcing member.

As shown in FIG. 13, the reinforcing member 4 is made of an elongate member, and includes, as a whole, rectangular frame members (31 to 33, 51 to 53) and an auxiliary member (54) positioned within the frame of the rectangular frame members (31 to 33, 51 to 53). The rectangular frame members (31 to 33, 51 to 53) include portions (31, 32, 51, 52) extending in the circumferential direction of the target object 2 and portions (33, 53) extending in the axial direction of the target object 2. In other words, each of the rectangular frame members (31 to 33, 51 to 53) forms one side of each rectangle. The members 31 and 51 (first reinforcing portion), the members 32 and 52 (second reinforcing portion), the member 33 (second reinforcing portion, third reinforcing portion), and the member 53 (second reinforcing portion, fourth reinforcing portion) form each side of the rectangle. Further, the auxiliary member (54) extends in the axial direction of the target object 2.

The surface of the target object 2 has, for example, a curved surface that is convex outward, such as a cylindrical outer peripheral surface. Thus, among the rectangular frame members (31 to 33, 51 to 53), the portions (31, 32, 51, 52) extending in the circumferential direction of the target object 2 are formed in a curved shape that is convex outward from one end side toward the other end side of the elongate shape, and are disposed along the curved surface of the target object 2. On the other hand, among the rectangular frame members (31 to 33, 51 to 53), the portions (33, 53) extending in the axial direction of the target object 2 and the auxiliary member (54) are formed, for example, in a linear shape from one end side toward the other end side of the elongate shape, and are disposed along the axial direction of the outer peripheral surface of the target object 2. However, the portions (33, 53, 54) are not limited to a linear shape, and are formed in a shape corresponding to the shape of the outer peripheral surface of the target object 2 in the axial direction.

Then, as shown in FIG. 2, the rectangular frame members (31 to 33, 51 to 53) are located in positions corresponding to the outer peripheral edge of the sound absorbing sheet 3. In other words, in this example, as shown in FIG. 2, the rectangular frame members (31 to 33, 51 to 53) are disposed on the front surface of the sound absorbing sheet 3 over the entire outer peripheral edge, and as shown in FIG. 3 to FIG. 12, the sound absorbing sheet 3 is disposed and sandwiched between the rectangular frame members (31 to 33, 51 to 53) and the target object 2.

Each of the first divided reinforcing member 30 and the second divided reinforcing member 50 constituting the reinforcing member 4 will be described below. The first divided reinforcing member 30 will be described with reference to FIG. 14 and FIG. 15. The first divided reinforcing member 30 includes circumferential members 31 and 32 and an axial member 33.

The circumferential members 31 and 32 are each made of an elongate member and extend in the circumferential direction of the target object 2. In other words, the circumferential members 31 and 32 are formed in a shape along the outer convex circumferential surface of the outer peripheral surface of the target object 2. The circumferential members 31 and 32 are spaced apart in the axial direction of the target object 2.

The circumferential member 31 of the first divided reinforcing member 30 is disposed along a portion of the edge of the first divided sound absorbing sheet 10 constituting the sound absorbing sheet 3. Specifically, the circumferential member 31 is disposed to overlap a portion of the edge of the first divided sound absorbing sheet 10 on the front surface of the first sheet body 11. The other circumferential member 32 is disposed at an edge, which is opposite to the edge of the first divided sound absorbing sheet 10 on which the circumferential member 31 is disposed, among the edges of the first divided sound absorbing sheet 10. In other words, the circumferential members 31 and 32 are disposed in different positions opposite to each other in the axial direction of the target object 2 at the edges of the first divided sound absorbing sheet 10. In this way, the circumferential members 31 and 32 are disposed apart from each other in the surface direction of the first divided sound absorbing sheet 10. Then, the circumferential member 32 is disposed to overlap a portion of the edge of the first divided sound absorbing sheet 10 on the front surface of the first sheet body 11.

The axial member 33 of the first divided reinforcing member 30 is made of an elongate member and connects the ends of the circumferential members 31 and 32 to each other. The axial member 33 extends in the axial direction of the target object 2. In other words, the axial member 33 is disposed to be coupled to each of the circumferential members 31 and 32. Thus, the axial member 33 is disposed along a portion of the edge of the first divided sound absorbing sheet 10. Specifically, the axial member 33 is disposed to overlap a portion of the edge of the first divided sound absorbing sheet 10 on the front surface of the first sheet body 11. Although the axial member 33 and the circumferential members 31 and 32 are coupled at the ends, the axial member 33 and the circumferential members 31 and 32 may be disposed to intersect in a cross shape or the like.

Furthermore, the circumferential member 31 that constitutes the first divided reinforcing member 30 includes an engaging portion 41 at a portion coupled to the axial member 33, that is, at one end in the longitudinal direction. The engaging portion 41 forms, for example, a cylindrical seat surface, and is disposed in a position to engage with the engaged portion 2a (bolt screwing hole, first engaged portion) of the target object 2. In this example, the engaging portion 41 has a hole through which a bolt serving as the engaging member 6a (shown in FIG. 2) is inserted, and is positioned to the engaged portion 2b of the target object 2 by the engaging member 6b. The engaging portion 41 may have a configuration to be directly locked to the engaged portion 2a of the target object 2 by a claw or the like.

Furthermore, the circumferential member 31 includes an engaging portion 42 at the other end in the longitudinal direction. The engaging portion 42 forms, for example, a cylindrical seat surface, and is disposed in a position to engage with the engaged portion 2b (bolt screwing hole, first engaged portion) of the target object 2. In this example, the engaging portion 42 has a hole through which a bolt serving as the engaging member 6b (shown in FIG. 2) is inserted, and is positioned to the engaged portion 2b of the target object 2 by the engaging member 6b. The engaging portion 42 differs in height from the central portion of the circumferential member 31. The engaging portion 42 is positioned away from the first divided sound absorbing sheet 10 in the surface normal direction.

The circumferential member 32 that constitutes the first divided reinforcing member 30 includes an engaging portion 43 at a portion coupled to the axial member 33. The engaging portion 43 forms, for example, a cylindrical seat surface, and is disposed in a position to be engaged with the engaged portion 2e (bolt screwing hole, second engaged portion) of the target object 2. In this example, the engaging portion 43 has a hole through which a bolt serving as the engaging member 6e (shown in FIG. 2) is inserted, and is positioned to the engaged portion 2e of the target object 2 by the engaging member 6e. In the target object 2, the engaged portions 2a and 2b with which the engaging portions 41 and 42 are engaged and the engaged portion 2e with which the engaging portion 43 is engaged are formed in different positions.

Furthermore, the circumferential member 32 includes an engaging portion 44 at the other end in the longitudinal direction. The engaging portion 44 forms, for example, a cylindrical seat surface, and is disposed in a position to engage with the engaged portion 2f (bolt screwing hole, second engaged portion) of the target object 2. In this example, the engaging portion 44 has a hole through which a bolt serving as the engaging member 6f (shown in FIG. 2) is inserted, and is positioned to the engaged portion 2f of the target object 2 by the engaging member 6f. The engaging portion 44 differs in height from the central portion of the circumferential member 32. The engaging portion 44 is positioned away from the first divided sound absorbing sheet 10 in the surface normal direction.

In this example, the engaging portions 41 and 43 are formed at the ends of the circumferential members 31 and 32 in the longitudinal direction, but the engaging portions 41 and 43 may be formed in the intermediate portions of the circumferential members 31 and 32 in the longitudinal direction. Moreover, instead of forming the engaging portions 41 and 43 on the circumferential members 31 and 32, an engaging portion may be formed on the axial member 33.

Figure 17:
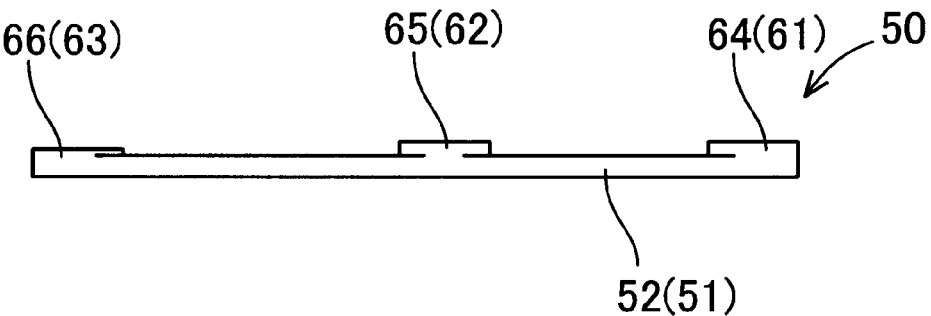
FIG. 17 is a view of the second divided reinforcing member seen from below of FIG. 16.

The second divided reinforcing member 50 will be described with reference to FIG. 16 and FIG. 17. The second divided reinforcing member 50 includes circumferential members 51 and 52 and axial members 53 and 54. The circumferential members 51 and 52 are each made of an elongate member and extend in the circumferential direction of the target object 2. In other words, the circumferential members 51 and 52 are formed in a shape along the outer convex circumferential surface of the outer peripheral surface of the target object 2. The circumferential members 51 and 52 are spaced apart in the axial direction of the target object 2.

The circumferential member 51 of the second divided reinforcing member 50 is disposed along a portion of the edges of the first divided sound absorbing sheet 10 and the second divided sound absorbing sheet 20 that constitute the sound absorbing sheet 3 across the first divided sound absorbing sheet 10 and the second divided sound absorbing sheet 20. Specifically, the circumferential member 51 is disposed to overlap a portion of the edge of the first divided sound absorbing sheet 10 on the front surface of the first sheet body 11, and a portion of the edge of the second divided sound absorbing sheet 20 on the front surface of the second sheet body 21.

The other circumferential member 52 is disposed at an edge, which is opposite to the edge of the first divided sound absorbing sheet 10 on which the circumferential member 51 is disposed, among the edges of the first divided sound absorbing sheet 10 and is disposed at an edge, which is opposite to the edge of the second divided sound absorbing sheet 20 on which the circumferential member 51 is disposed, among the edges of the second divided sound absorbing sheet 20. In other words, the circumferential member 52 is also disposed along a portion of the edges of the first divided sound absorbing sheet 10 and the second divided sound absorbing sheet that constitute the sound absorbing sheet 3 across the first divided sound absorbing sheet 10 and the second divided sound absorbing sheet 20.

The circumferential members 51 and 52 are disposed in different positions opposite to each other in the axial direction of the target object 2 at the edges of the first divided sound absorbing sheet 10 and the second divided sound absorbing sheet 20. In this way, the circumferential members 51 and 52 are disposed apart from each other in the surface direction of the first divided sound absorbing sheet 10 and the second divided sound absorbing sheet 20. Then, the circumferential member 52 is disposed to overlap a portion of the edge of the first divided sound absorbing sheet 10 on the front surface of the first sheet body 11 and a portion of the edge of the second divided sound absorbing sheet 20 on the front surface of the second sheet body 21.

The axial member 53 of the second divided reinforcing member 50 is made of an elongate member and connects the ends of the circumferential members 51 and 52 to each other. The axial member 53 extends in the axial direction of the target object 2. In other words, the axial member 53 is disposed to be coupled to each of the circumferential members 51 and 52. Thus, the axial member 53 is disposed along a portion of the edge of the second divided sound absorbing sheet 20. Specifically, the axial member 53 is disposed to overlap a portion of the edge of the second divided sound absorbing sheet 20 on the front surface of the second sheet body 21. Although the axial member 53 and the circumferential members 51 and 52 are coupled at the ends, the axial member 53 and the circumferential members 51 and 52 may be disposed to intersect in a cross shape or the like.

The axial member 54 of the second divided reinforcing member 50 is made of an elongate member, and connects the intermediate portions of the circumferential members 51 and 52 in the longitudinal direction. The axial member 54 extends in the axial direction of the target object 2. In other words, the axial member 54 is disposed to be coupled to each of the circumferential members 51 and 52. Further, the axial member 54 is disposed to overlap a portion of the second divided sound absorbing sheet 20 on the front surface of the second sheet body 21. Although the axial member 54 and the circumferential members 51 and 52 are coupled at the ends, the axial member 54 and the circumferential members 51 and 52 may be disposed to intersect in a cross shape or the like.

Furthermore, the circumferential member 51 that constitutes the second divided reinforcing member 50 includes an engaging portion 61 at a portion coupled to the axial member 53, that is, at one end in the longitudinal direction. The circumferential member 51 includes an engaging portion 62 at a portion coupled to the axial member 54, that is, at an intermediate portion in the longitudinal direction. The engaging portions 61 and 62 form, for example, cylindrical seat surfaces, and are disposed in positions to engage with the engaged portions 2d and 2c (bolt screwing holes, first engaged portions) of the target object 2. In this example, the engaging portions 61 and 62 have holes through which bolts serving as the engaging members 6d and 6c (shown in FIG. 2) are inserted, and are positioned to the engaged portions 2d and 2c of the target object 2 by the engaging members 6d and 6c. The engaging portions 61 and 62 may have a configuration to be directly locked to the engaged portions 2d and 2c of the target object 2 by claws or the like.

Furthermore, the circumferential member 51 includes an engaging portion 63 at the other end in the longitudinal direction. The engaging portion 63 forms, for example, a cylindrical seat surface, and is disposed in a position to engage with the engaged portion 2b (bolt screwing hole, first engaged portion) of the target object 2. The engaging portion 63 is disposed to overlap the engaging portion 42 of the first divided reinforcing member 30. In this example, the engaging portion 63 has a hole through which a bolt serving as the engaging member 6b (shown in FIG. 2) is inserted, and is positioned to the engaged portion 2b of the target object 2 together with the engaging portion 42 by the engaging member 6b.

The circumferential member 52 that constitutes the second divided reinforcing member 50 includes an engaging portion 64 at a portion coupled to the axial member 53, that is, at one end in the longitudinal direction. The circumferential member 52 includes an engaging portion 65 at a portion coupled to the axial member 54, that is, at an intermediate portion in the longitudinal direction. The engaging portions 64 and 65 form, for example, cylindrical seat surfaces, and are disposed in positions to engage with the engaged portions 2h and 2g (bolt screwing holes, second engaged portions) of the target object 2. In this example, the engaging portions 64 and 65 have holes through which bolts serving as the engaging members 6h and 6g (shown in FIG.

2) are inserted, and are positioned to the engaged portions 2*h* and 2*g* of the target object 2 by the engaging members 6*h* and 6*g*. The engaging portions 64 and 65 may have a configuration to be directly locked to the engaged portions 2*h* and 2*g* of the target object 2 by claws or the like.

Furthermore, the circumferential member 52 includes an engaging portion 66 at the other end in the longitudinal direction. The engaging portion 66 forms, for example, a cylindrical seat surface, and is disposed in a position to engage with the engaged portion 2*f* (bolt screwing hole, second engaged portion) of the target object 2. The engaging portion 66 is disposed to overlap the engaging portion 44 of the first divided reinforcing member 30. In this example, the engaging portion 66 has a hole through which a bolt serving as the engaging member 6*f* (shown in FIG. 2) is inserted, and is positioned to the engaged portion 2*f* of the target object 2 together with the engaging portion 44 by the engaging member 6*f*.

As described above, the sound absorbing sheet 3 is composed of a plurality of divided bodies 10 and 20, and the reinforcing member 4 is composed of a plurality of divided bodies 30 and 50. Thus, it is possible to easily attach the soundproof cover 1 to the target object 2 when configured to cover the entire circumference of the target object 2.

Further, in the case where the sound absorbing sheet 3 is composed of a plurality of divided bodies 10 and 20, the circumferential members 51 and 52 of the second divided reinforcing member 50 are disposed across the plurality of divided bodies 10 and 20. Thus, the plurality of divided bodies 10 and 20 constituting the sound absorbing sheet 3 can be reliably positioned.

3. Other Examples

In the above example, the reinforcing member 4 is formed separately from the sound absorbing sheet 3 and disposed on the front surface of the sound absorbing sheet 3, and the sound absorbing sheet 3 is disposed and sandwiched between the reinforcing member 4 and the target object 2.

Figure 18:
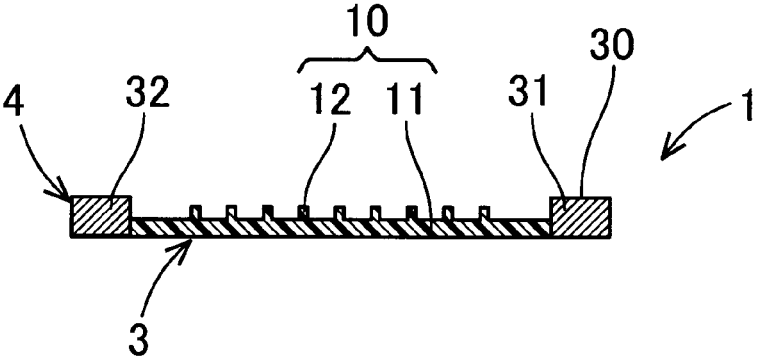
FIG. 18 is a view of the cross section of the soundproof cover according to another example.

In addition, as shown in FIG. 18, the reinforcing member 4 is integrated with the peripheral surface (the end surface in the surface direction) of the sound absorbing sheet 3. In this case, the reinforcing member 4 is fixed to the target object 2 without the sound absorbing sheet 3 interposed therebetween. By fixing the reinforcing member 4 to the target object 2, the sound absorbing sheet 3 integrated with the reinforcing member 4 is positioned with respect to the target object 2.

For example, the circumferential members 31 and 32 and the axial member 33 that constitute the first divided reinforcing member 30 are integrated in adjacent positions on the peripheral surface of the first divided sound absorbing sheet 10. The circumferential members 51 and 52 and the axial member 53 that constitute the second divided reinforcing member 50 are integrated in adjacent positions on the peripheral surface of the second divided sound absorbing sheet 20.

Further, the axial member 54 constituting the second divided reinforcing member 50 may be integrated on the front surface of the second divided sound absorbing sheet 20. In addition, by further dividing the sound absorbing sheet 3, the axial member 54 that constitutes the second divided reinforcing member 50 may also be integrated with the peripheral surface of the divided sound absorbing sheet 3.

In FIG. 18, each elongate member (31, 32, 33, 51, 52, 53, 54) constituting the reinforcing member 4 is integrated with the peripheral surface of the sound absorbing sheet 3. In addition, each elongate member (31, 32, 33, 51, 52, 53, 54) constituting the reinforcing member 4 may be integrated on the front surface of the sound absorbing sheet 3.

What is claimed is:

1. A soundproof cover covering a target object, the soundproof cover comprising:
   a sound absorbing sheet formed in a planar shape from a sound absorbing material and covering a surface of the target object; and
   a reinforcing member disposed in a position to engage with an engaged portion of the target object and positioning the sound absorbing sheet with respect to the target object with at least a portion of the sound absorbing sheet exposed,
   wherein the reinforcing member comprises:
      a first reinforcing portion which is an elongate member and is disposed in a position to engage with a first engaged portion of the target object; and
      a second reinforcing portion which is an elongate member and is disposed in a position different from the first reinforcing portion,
   wherein the sound absorbing sheet comprises a plurality of heat dissipating fins on the front surface, the sound absorbing sheet is made of foamed resin containing a thermally conductive material, and the thermally conductive material continuously extends in a surface normal direction of the sound absorbing sheet from a back surface of the sound absorbing sheet to a tip of the heat dissipating fins.

2. The soundproof cover according to claim 1, wherein the second reinforcing portion is disposed in a position to engage with a second engaged portion different from the first engaged portion of the target object.

3. The soundproof cover according to claim 1, wherein the reinforcing member is formed separately from or integrated with the sound absorbing sheet and is disposed on a front surface of the sound absorbing sheet so that the sound absorbing sheet is disposed and sandwiched between the reinforcing member and the target object.

4. The soundproof cover according to claim 3, wherein the first reinforcing portion and the second reinforcing portion are disposed apart from each other in a surface direction of the sound absorbing sheet on the front surface of the sound absorbing sheet.

5. The soundproof cover according to claim 4, wherein the first reinforcing portion and the second reinforcing portion are disposed in different positions at an edge of the sound absorbing sheet on the front surface of the sound absorbing sheet.

6. The soundproof cover according to claim 3, wherein the first reinforcing portion and the second reinforcing portion are coupled and disposed on the front surface of the sound absorbing sheet.

7. The soundproof cover according to claim 1, wherein the reinforcing member is integrated with a peripheral surface of the sound absorbing sheet.

8. The soundproof cover according to claim 7, wherein the first reinforcing portion is integrated with a first position on the peripheral surface of the sound absorbing sheet, and
   the second reinforcing portion is integrated with a position opposite to the first position on the peripheral surface of the sound absorbing sheet.

9. The soundproof cover according to claim 7, wherein the first reinforcing portion is integrated with a first position on a peripheral surface of the sound absorbing sheet, and the second reinforcing portion is integrated with the first reinforcing portion and is integrated with a position adjacent to the first position on the peripheral surface of the sound absorbing sheet.

10. The soundproof cover according to claim 1, wherein the sound absorbing sheet comprises a plurality of divided bodies formed separately, and at least one of the first reinforcing portion and the second reinforcing portion is disposed across the plurality of divided bodies.

11. The soundproof cover according to claim 1, wherein the surface of the target object has a curved surface that is convex outward, and at least one of the first reinforcing portion and the second reinforcing portion is formed in a curved shape that is convex outward from one end side toward the other end side of an elongate shape, and is disposed along the curved surface of the target object.

12. The soundproof cover according to claim 1, wherein the sound absorbing sheet is made of foamed resin, and the reinforcing member is made of foamed resin different from the foamed resin of the sound absorbing sheet.

13. The soundproof cover according to claim 12, wherein the foamed resin of the reinforcing member has an Asker C hardness of 60 to 99 degrees.

14. The soundproof cover according to claim 13, wherein the foamed resin of the sound absorbing sheet has an Asker C hardness of 1 to 60 degrees.

15. The soundproof cover according to claim 12, wherein the sound absorbing sheet has a surface layer in a closed cell state where cells of the foamed resin are closed.

16. The soundproof cover according to claim 15, wherein the sound absorbing sheet has a back layer in an open cell state where cells of the foamed resin are open.

17. The soundproof cover according to claim 1, wherein the sound absorbing sheet is made of foamed resin, and the reinforcing member is made of rubber, resin or metal having higher hardness than the foamed resin.

18. The soundproof cover according to claim 1, wherein the soundproof cover further comprises a ventilation guide which is fixed to the reinforcing member, is disposed oppositely along the front surface of the sound absorbing sheet, and guides flow of a fluid between the ventilation guide and the front surface of the sound absorbing sheet.

19. The soundproof cover according to claim 18, wherein the ventilation guide is made of the same material as the reinforcing member.

20. The soundproof cover according to claim 18, wherein the ventilation guide is made of a material having different rigidity from the reinforcing member.

21. The soundproof cover according to claim 18, wherein the target object is a power source of a vehicle, and the ventilation guide is disposed to face a rear surface of the target object in a front-rear direction of the vehicle, and guides the fluid flowing from front toward rear of the vehicle to the rear surface of the target object.

22. The soundproof cover according to claim 1, wherein the reinforcing member further comprises a third reinforcing portion which is an elongate member and is disposed in a different position from the first reinforcing portion and the second reinforcing portion.

23. The soundproof cover according to claim 22, wherein the reinforcing member further comprises a fourth reinforcing portion which is an elongate member and disposed in a different position from the first reinforcing portion, the second reinforcing portion, and the third reinforcing portion.

24. The soundproof cover according to claim 23, wherein the first reinforcing portion, the second reinforcing portion, the third reinforcing portion, and the fourth reinforcing portion constitute rectangular frame members forming one side of each rectangle.

25. The soundproof cover according to claim 1, wherein the sound absorbing sheet comprises a plurality of divided bodies formed separately and respectively comprising the plurality of heat dissipating fins, and the heat dissipating fins of the plurality of divided bodies adjacent to each other are disposed continuously.

26. The soundproof cover according to claim 1, wherein the heat dissipating fins extend in the surface direction of the sound absorbing sheet, and the sound absorbing sheet is made of foamed resin containing a second thermally conductive material, and the second thermally conductive material extends along an extending direction of the heat dissipating fins on a tip side of the heat dissipating fins of the sound absorbing sheet.

27. The soundproof cover according to claim 1, wherein the thermally conductive material extends from the back surface toward the front surface of the sound absorbing sheet.

28. The soundproof cover according to claim 27, wherein the thermally conductive material is a thermally conductive filler and is arranged from the back surface toward the front surface of the sound absorbing sheet, and a filling amount of the thermally conductive material varies depending on a position of the sound absorbing sheet.

\* \* \* \* \*